Patented Mar. 26, 1946

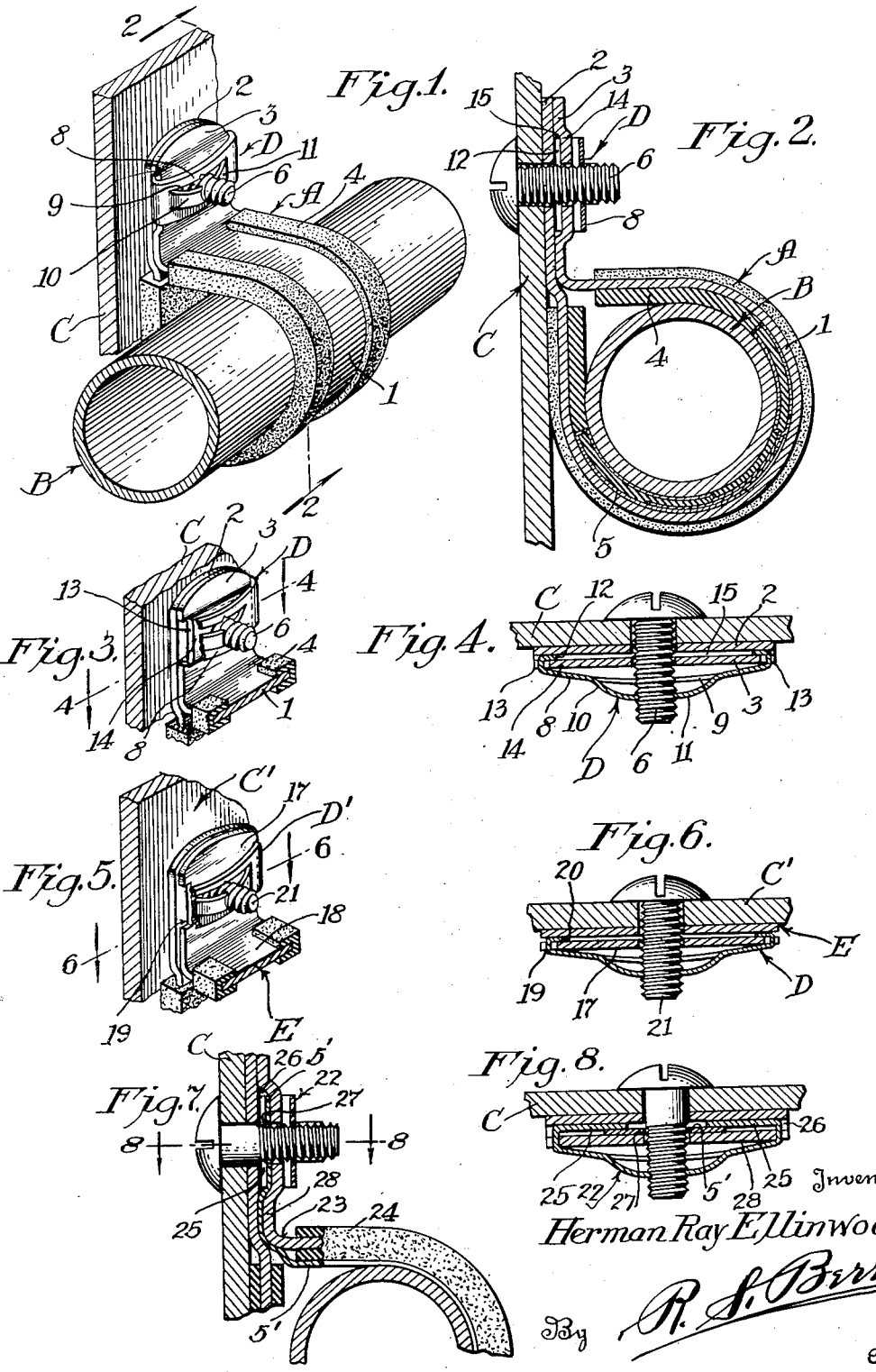

2,397,253

UNITED STATES PATENT OFFICE 2,397,253

CONDUIT CLIP FASTENING MEANS

Herman Ray Ellinwood, Burbank, Calif., assignor to Adel Precision Products Corp., Burbank, Calif., a corporation of California Application November 26, 1941, Serial No. 420,575

5 Claims. (Cl. 174—40)

This invention relates in general to clips for supporting conduit and other lines in aircraft after the manner shown in United States Letters Patent No. 2,215,283 issued September 17, 1940 to Paul W. Adler, and more particularly pertains to a new and efficient fastening means embodied in such clips.

The primary object of the present invention is to provide a line supporting clip of the character described wherein one of the terminals of the line-embracing strap forming the body portion of the clip is especially constructed to support and retain thereon a comparatively inexpensive and efficient sheet metal lock nut which is especially constructed to facilitate the mounting thereof on said terminal as a part of the clip assembly. With this arrangement the nut is at all times ready for cooperation with a screw or like fastening for holding the clip embraced on the line and secured to the frame structure of the airplane to the end that tedious and time consuming handling of separate nuts or similar fastenings, the formation of screw threaded openings in the frame structure, and the use of the relatively expensive screw threaded types of nuts are unnecessary.

Another object of the invention is to provide a combined line supporting clip and fastening means of the character described wherein the strap is provided with an apertured terminal having a notch in an edge thereof whereby a nut mounted on one face of said terminal and having a portion extended into said notch will be retained on said terminal with the aperture thereof aligned with the aperture in the terminal.

A further object of the invention is to provide a combined clip and fastening means such as described wherein the strap of the clip and the nut are constructed so that the nut may be clipped thereon yet remain flush with one face of the portion of the strap to which it is clipped whereby said face may be brought into desired close contact with an opposite portion of the strap for the purpose of effectively securing the clip in place and preventing chafing and wear which might otherwise be occasioned.

Another object of the invention is to provide a combined clip and fastening such as described wherein a fastening element in the form of a resilient sheet metal nut adapted to be placed under tension when in use, is mounted on the strap in such manner as to permit of it being placed under tension without deranging the connection of the nut with the strap.

With the foregoing objects in view, together with such other objects and advantages as may subsequently appear, the invention is carried into effect as illustrated by way of example in the accompanying drawing, in which:

Fig. 1 is a perspective view of a line supporting clip embodying my invention;

Fig. 2 is a sectional view taken on the plane of the line 2—2 of Fig. 1;

Fig. 3 is a fragmentary perspective view of the special formation at one of the terminals of the strap;

Fig. 4 is a sectional view on the line 4—4 of Fig. 1;

Fig. 5 is a fragmentary perspective of a modified form of the invention;

Fig. 6 is a sectional view taken on the line 6—6 of Fig. 5;

Fig. 7 is a sectional view of a modified form of my invention;

Fig. 8 is a sectional view taken on the line 8—8 of Fig. 7.

Referring to the drawing more specifically, A designates a line supporting clip, B a conduit embraced by said clip, and C a metallic part of the frame of an airplane to which the clip is secured by the fastening means of the present invention.

The clip here shown includes a metallic conduit embracing strap 1 having apertured terminals 2 and 3 and supporting a cushion 4 of resilient insulation material, said cushion preferably being formed of neoprene or some other similar rubber-like insulation material which is chemically inert. Supported by the cushion 4 in contact with the metal strap 1 and so as to be contacted by the conduit line B is an electrical bonding strip 5 of suitable metallic material which will discharge static electricity in the conduit line through the strap into the metal structure C of the airplane.

It has been the practice in using clips of this type to secure the terminals of the straps thereof together and to the metal structure of the airplane by means of a bolt or screw such as the one 6 here shown. Usually elastic stop nuts or similar screw threaded nuts or separate fastening elements are employed together with the screw or bolt to maintain the clip in operative position. Heretofore the preferred fastening element for use in connection with the bolt or screw was an elastic stop nut wherein a compressible gasket of leather or the like is embedded and retained in the nut to jamb against the threads of the screw or bolt and thereby lock the nut in place. These fastenings are comparatively expensive and when not mounted on the clip as a part thereof require tedious and time consuming separate handling, and even when mounted necessitate special formation thereof and of the clip which further increases the cost of the fastening means.

In consideration of the foregoing objections, I have found that a simple and relatively inexpensive form of resilient sheet metal nut which is without screw threads, when combined in a particular manner with a clip such as described, as a part of the clip assembly, will eliminate separate handling of the nut and the objectionable costs heretofore entailed in providing screw threaded nuts and similar forms of fastenings and yet securely fasten the clip in place.

In accordance with the present invention I employ as a part of the fastening means of my invention a nut D made of resilient sheet metal for example, spring steel, and comprising a rectangular somewhat upwardly bowed base 8 having an opening 9 between its ends formed at least in part by striking upwardly therefrom spring tongues 10 and 11. These tongues are spaced apart and adapted to engage opposite sides of the bolt 6 in tensioned engagement with the screw threads thereof. As here shown the base 8 is disposed on the outer face of the terminal 3 of the strap 1 with the ends 12 thereof bent to hold the nut on said terminal and in alignment with the aperture in said terminal. Notches 13 may be formed as here shown in the side edges of the terminal 3 to receive the ends 12 of base of the nut to prevent the nut from shifting. The ends 12 are preferably bent inwardly to lie against the inner face of the terminal 3 so as to securely fasten the nut to the clip. In order that these inwardly bent ends 12 be flush with the inner face of the terminal 3 a transverse rib 14 is formed in said terminal so as to define a transverse groove or depression 15 in the inner face of said terminal, said groove receiving the ends 12 as best shown in Fig. 4. The nut D lies upon the rib 14 it being noted that the base 8 of the nut and the rib are of approximately the same width and that the rib is flat on its outer face to afford a seat for the nut.

It is now apparent that the clip of this invention may be readily clamped on the conduit and secured to the frame structure of an airplane upon appropriately turning the bolt 6, said bolt cooperating with the tongues 10 and 11 of the nut which latter engage the screw threads of the bolt similarly to the threads of a nut. When the terminals 2 and 3 are brought into close contact, as shown in Figs. 1 and 2, in fact before this takes place, the tongues 10 and 11 will be under tension as will also the bowed base 8, thus providing a double spring action or tension on the nut and thereby locking the nut on the bolt. The spring nut also affords a tensioned engagement of the terminal 1 with the frame structure C whereby to insure a good electrical contact thereof with said structure and provide an effective "grounding" of the conduit to the metal frame structure of the airplane.

As shown in Figs. 5 and 6 a modified form of my invention includes a clip E corresponding to clip B shown in Figs. 1 to 4 inclusive except that the terminal 17 of the metal strap 18 has a plane outer surface instead of the rib as in the first described form of my invention. Notches 19 are provided on the side edges of the terminal to receive the bent ends 20 of the nut D'. This nut is identical with nut D and its ends 20 are bent inwardly to lie against the inner face of the terminal 17 to hold the nut in place for cooperation with the screw 21 inserted through a metal frame portion C' of the airplane.

It should be noted that in both forms of the invention here shown the strap and the nut are so constructed and arranged as to permit the nut to straighten out when compressed and put under tension, without causing the bent-over ends of the nut to be removed from the notches in the side edges of the strap.

As shown in Figs. 7 and 8 I may use a nut such as the one 22 as a means for securing the bonding strip 5' directly to the metal strap 23 instead of having the cushion 24 carry the strip as shown in Fig. 2. In this arrangement, the ends 25 of the nut are bent over into the groove 26 so as to clamp against and hold the bonding strip 5' in good electrical contact with the inner face of one terminal of the metal strap, said strip being widened and apertured as at 27 to allow the bolt to pass therethrough. The main part of the strip 5' extends into the clip so as to lie upon the cushion and extend part way around the clip for contact with the conduit. Where the two ends of the strip come together as at 28 they will further clamp and hold the bonding strip in place and in bonding contact with the strap.

The ends 25 lying in the groove 26 will be disposed flush with the inner face of the terminal of the strap to which the nut is secured. However, it is seen that the groove 26 could be omitted and the ends of the nut employed to clamp and hold the strip 5' in place in the same manner as shown in Figs. 7 and 8.

In this modified form of my invention the nut and strap have cooperating positions which serve the two-fold purpose of holding the nut on and bonding the bonding strip to the metal strap.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a supporting clip for a conduit or other line, a strap adapted to embrace a conduit or other line and having an apertured terminal, a nut extending across one face of said terminal and having its aperture aligned with the aperture in said terminal, end portions on said nut bent to extend around opposite edges and lie against the other face of said terminal to hold the nut in place, a cushion of insulation material interposed between the strap and said conduit, and a metallic bonding strip having one portion thereof clamped and bonded to said strap by means of said end portions of said nut, and another portion thereof overlying said cushion for engagement with said conduit.

2. In a supporting clip for a conduit or other line, a metallic strap adapted to embrace a conduit or other line, a cushion of insulation material carried by said strap for contact with the conduit or other line, a nut carried by one terminal of said strap for threaded engagement with a bolt passed through both terminals of the strap, a metallic bonding strip overlying said cushion for contacting the conduit or other line, and a portion on said nut for holding said nut on and bonding said strip to said strap.

3. In a supporting clip for a conduit or other line, a metallic strap adapted to embrace a conduit or other line, a cushion of insulation material carried by said strap for contact with the conduit or other line, a nut carried by one terminal of said strap for threaded engagement with a bolt passed through both terminals of the strap, a metallic bonding strip overlying said cushion for contacting the conduit or other line, and cooperating portions on the nut and said one terminal of said strap for securing the nut on and bonding the strip to said strap.

4. A fastening device having a loop with a cushion on its inner face to engage a member to be held, a clip embracing a projecting arm of the loop and formed with means to engage a screw thread, and a grounding member on the inner face of the cushion held in place by the clip.

5. In a fastening device, the combination of a loop, a yielding layer of material on the concave side of the loop, said loop having a projecting arm with an opening through it, an arcuate strap formed to lie against the inner face of the yielding cushion and a clip doubled on itself and extending across opposite faces of the arm and serving the double purpose of holding the strap in position and providing a nut for a screw passing through the arm.

HERMAN RAY ELLINWOOD.